US007826845B2

(12) United States Patent
Chen

(10) Patent No.: US 7,826,845 B2
(45) Date of Patent: Nov. 2, 2010

(54) WIRELESS NETWORK CONNECTION METHOD AND MOBILE PHONE USING THE SAME

(75) Inventor: Chih-Wen Chen, Taipei (TW)

(73) Assignee: Wistron NeWeb Corp., Taipei Hsien (TW)

( * ) Notice: Subject to any disclaimer, the term of this patent is extended or adjusted under 35 U.S.C. 154(b) by 532 days.

(21) Appl. No.: 11/752,889

(22) Filed: May 23, 2007

(65) Prior Publication Data

US 2008/0014916 A1 Jan. 17, 2008

(30) Foreign Application Priority Data

Jul. 11, 2006 (TW) .............................. 95125227 A

(51) Int. Cl.
*H04W 4/00* (2009.01)
(52) U.S. Cl. .............. 455/435.3; 455/432.1; 455/435.1; 455/435.2
(58) Field of Classification Search .............. 455/432.1, 455/435.1, 435.2, 435.3
See application file for complete search history.

(56) References Cited

U.S. PATENT DOCUMENTS 5,159,625 A * 10/1992 Zicker ..................... 455/432.1

| 6,085,110 | A | 7/2000 | Nilsson |
| 2005/0144237 | A1* | 6/2005 | Heredia et al. ............... 709/206 |
| 2006/0234705 | A1* | 10/2006 | Oommen .................. 455/435.3 |
| 2007/0004408 | A1* | 1/2007 | Buckley et al. ........... 455/435.2 |

FOREIGN PATENT DOCUMENTS

| CN | 1191659 A | 8/1998 |
| CN | 1510866 A | 7/2004 |
| WO | WO 2004/008693 A1 | 1/2004 |

* cited by examiner

*Primary Examiner*—Barry W Taylor

(57) ABSTRACT

A mobile phone is provided. A wireless connection module establishes a wireless connection between the mobile phone and an access point. A storage device stores a first configuration group, a second configuration group, and a third configuration group, each comprising at least one wireless network configuration file. A controller, when a wireless network function of the mobile phone is activated, selects the wireless network configuration file from the first configuration group, when failing to establish a wireless connection based on the wireless network configuration file selected from the first configuration group, selects the wireless network configuration file from the second configuration group, when failing to establish a wireless connection based on the wireless network configuration file selected from the second configuration group, selects the wireless network configuration file from the third configuration group, and establishes the wireless connection according to the selected wireless network configuration file.

21 Claims, 5 Drawing Sheets

WIRELESS NETWORK CONNECTION METHOD AND MOBILE PHONE USING THE SAME

BACKGROUND

The invention relates to mobile phones, and more particularly to a wireless network connection method for a mobile phone.

This section is intended to introduce the reader to various aspects of the art, which may be related to various aspects of the invention, which are described and/or claimed below. This discussion is believed to be helpful in providing the reader with background information to facilitate a better understanding of the various aspects of the invention. Accordingly, it should be understood that these statements are to be read in this light, and not as admissions of related art.

Mobile phones are popularly used for making phone calls, surfing the web, emailing over a wireless network. A mobile phone capable of wireless connection can establish a wireless connection with any access point. Thus, for a telecommunication service supplier providing cellular network service as well as wireless connection service, it is difficult to enhance the utility rate of its cellular network subscribers over the wireless connection service.

In addition, different wireless network configuration files are required for establishing the wireless connection with different access points. Accordingly, a wireless when connection with a new access point is desired, the wireless network configuration file must be manually reset, which may be considered inconvenient.

Connection over a wireless network is susceptible to signal interference. The communication range covered by an access point of a wireless network is quite small. Therefore, disconnects frequently occur during a session.

Conventional mobile phone, however, cannot automatically reestablish disconnected wireless connection. Conversely, attempting to re-establish a disconnected wireless connection without evaluation may drain the battery of the mobile phone.

Hence, there is a need for a wireless network connection method that addresses the incompatibility problems arising from the existing technology.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention.

A wireless network connection method for a mobile phone is provided. A first configuration group, a second configuration group, and a third configuration group is provided, each of group comprising at least one wireless network configuration file. When a wireless network function of the mobile phone is activated, the wireless network configuration file is selected from the first configuration group. When failing to establish to establish a wireless connection based on the wireless network configuration file selected from the first configuration group, the wireless network configuration file is selected from the second configuration group. When failing to establish a wireless connection based on the wireless network configuration file selected from the second configuration group, the wireless network configuration file is selected from the third configuration group. The wireless connection is then established based on the selected wireless network configuration file.

A mobile phone is provided. A wireless connection module establishes a wireless connection between the mobile phone and an access point. A storage device stores a first configuration group, a second configuration group, and a third configuration group, each comprising group comprising at least one wireless network configuration file. A controller, when a wireless network function of the mobile phone is activated, selects the wireless network configuration file from the first configuration group. When failing to establish a wireless connection based on the wireless network configuration file selected from the first configuration group, the controller selects the wireless network configuration file from the second configuration group. When failing to establish a wireless connection based on the wireless network configuration file selected from the second configuration group, controller selects the wireless network configuration file from the third configuration group, and establishes the wireless connection according to the selected wireless network configuration file.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve developer specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The invention is now described with reference to FIGS. 1 through 4, which generally relate to wireless network connection method. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures correspond to the Figure number, with the exception that the same reference number is used throughout to refer to an identical component which appears in multiple figures. It should be understood that many of the elements described and illustrated throughout the specification are functional in nature and may be embodied in one or more physical entities or may take other forms beyond those described or depicted.

Figure 1:
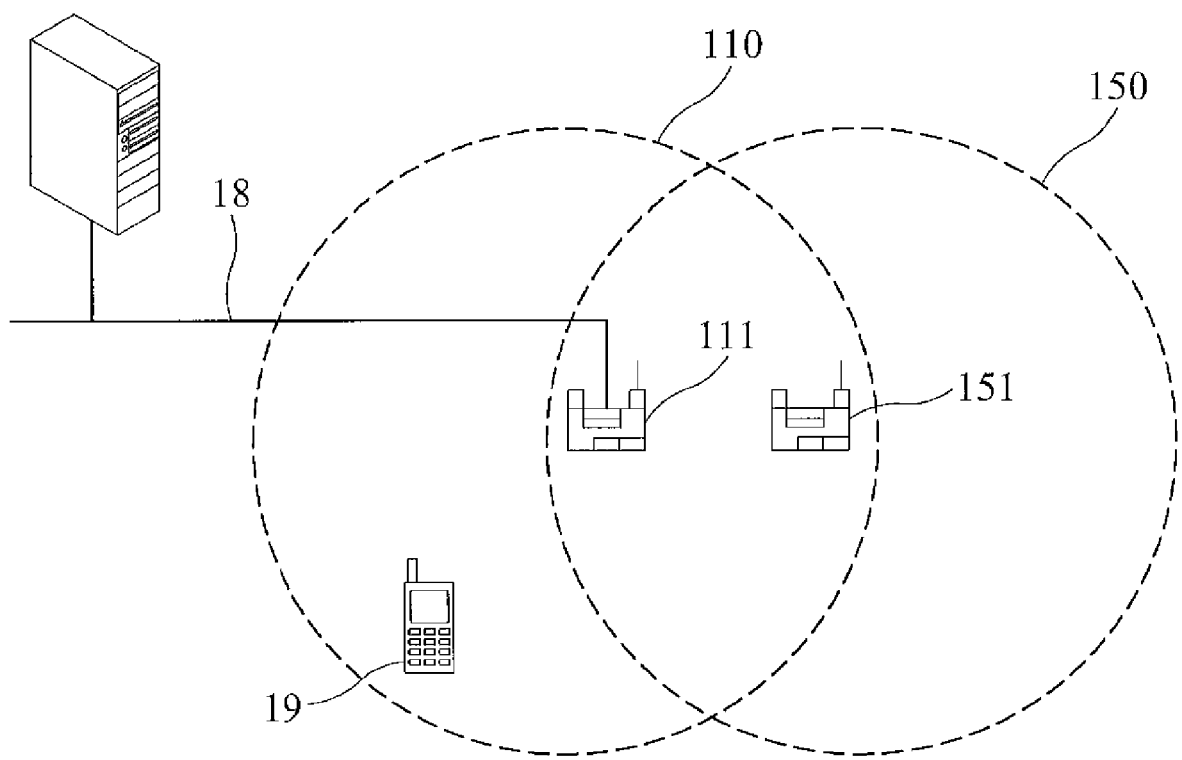
FIG. 1 is a schematic view of an embodiment of a wireless communication network.

FIG. 1 is a schematic view of an embodiment of a wireless communication network. FIG. 1 illustrates wireless local area networks (WLANs) 110 and 150. Devices capable of wireless communication can access WLANs 110 and 150 through access points 111 and 151, respectively.

WLAN 110 comprises two basic elements, an access point 111 and a client network card (not shown). Access point 111 connects to wired network backbone 18. Similarly, WLAN 150 comprises access point 151 and client network card (not shown). The access point is the central point of a WLAN, or a connection point between a wired and wireless network. Multiple access points may be arranged within a building or an important access site, enabling clients equipped with a WLAN network card to maintain uninterrupted connection even while moving. In this case, for example, a mobile phone 19 comprising a wireless communication function can move from location 16 to location 17 using the wireless communication roaming function.

Figure 2:
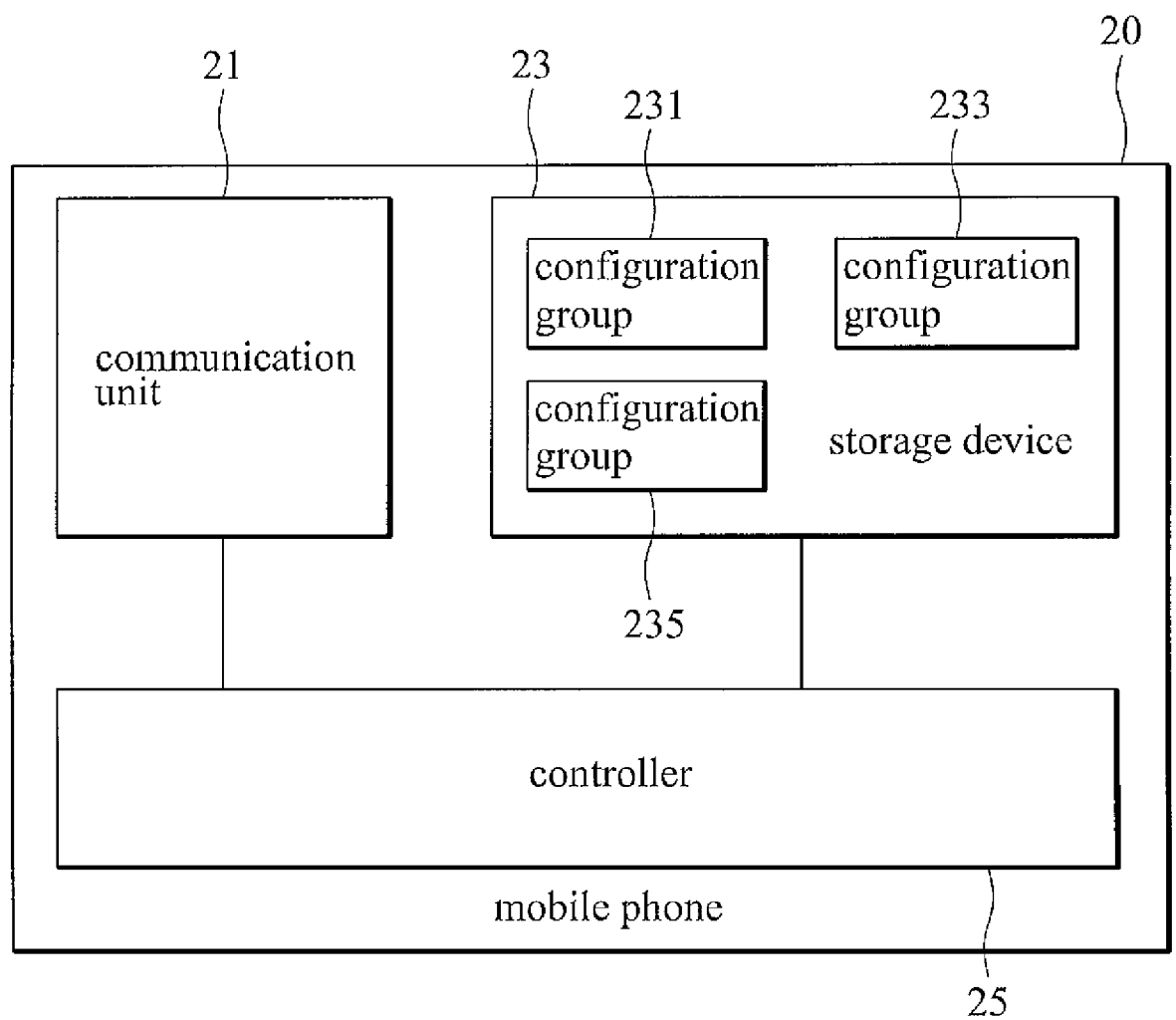
FIG. 2 is a schematic view of an embodiment of a mobile phone.

FIG. 2 is a schematic view of an embodiment of a mobile phone. A mobile phone 20 comprises a communication unit 21, a storage device 23, and a controller 25. The communication unit 21 establishes a wireless connection between a wireless access point and the mobile phone 20. The storage device 23 stores a plurality of configuration groups, each comprising at least one wireless network configuration file. Here, the storage device 23 stores configuration groups 231, 233, and 235. The configuration group 231 comprises wireless network configuration files set by a telecommunication service supplier. The configuration group 233 comprises wireless network configuration files set by a subscriber of the mobile phone. The configuration group 235 comprises wireless network configuration files directing the mobile phone 20 to search for an access point and establish wireless connection therewith. Here, the wireless network configuration file is selected in the order of configuration groups 231, 233, and 235. The priority among the configuration groups 231, 233, and 235 can be determined according to requirements.

The wireless network configuration files of configuration groups 231, 233, and 235 specify parameters for establishing a wireless connection, such as a service set identifier (SSID) of an access point. The SSID is specified as a string of characters recorded in a packet transmitted over a wireless network. The SSID serves as an identification of the access point. A mobile terminal scans for available access points based on the SSID. The SSID of the access point is set by a corresponding manufacturer, and is transmitted within the radio range of the access point by a broadcast packet. Any mobile terminal located within the radio range can receive the broadcast packet sent from the access point.

The controller 25 selects a suitable wireless network configuration file from one of configuration groups 231, 233, and 235, and directs the communication unit 21 to establish a wireless connection. The controller 25 operates as depicted in FIGS. 3 and 4.

Figure 3:
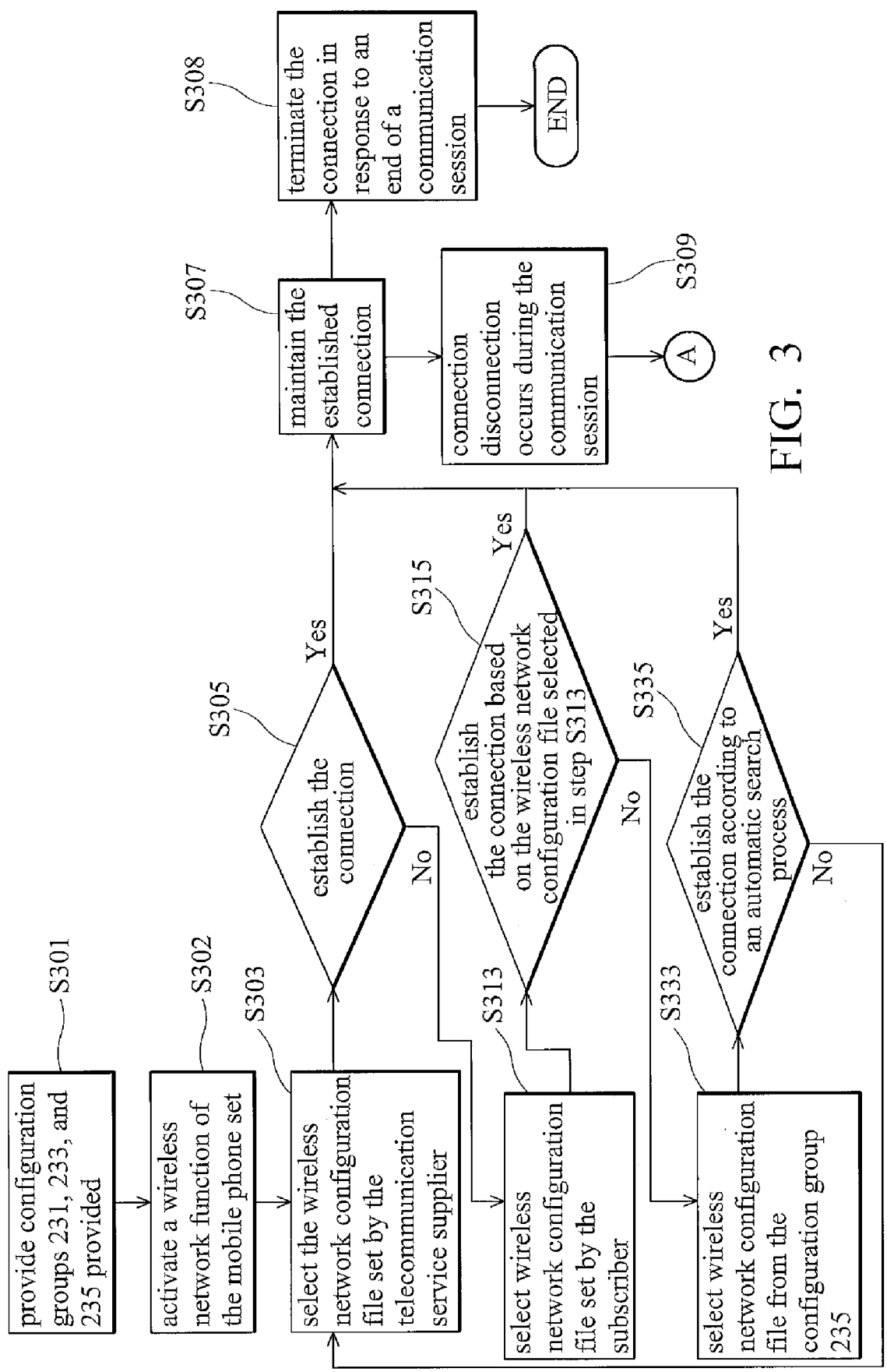
FIG. 3 is a flowchart of an embodiment of a wireless network connection method for a mobile phone.

FIG. 3 is a flowchart of an embodiment of a wireless network connection method for a mobile phone.

Referring to FIG. 3, configuration groups 231, 233, and 235 are first provided (step S301). Here, the storage device 23 stores the configuration groups 231, 233, and 235. The wireless network configuration files of the configuration group 231 are set by a telecommunication service supplier; the wireless network configuration files of the configuration group 233 are set by a subscriber of the mobile phone; the wireless network configuration files of the configuration group specify an automatic search process. When determining the proper wireless network configuration file for establishing the connection, the configuration groups 231, 233, and 235 are searched in sequence. Accordingly, the wireless network configuration files set by a telecommunication service supplier is considered first, when failing to establish the connection based on the wireless network configuration file selected from the configuration group 231, wireless network configuration file set by a subscriber of the mobile phone is selected, and when failing to establish a wireless connection based on the wireless network configuration file selected from the configuration group 233, the automatic search process is performed to establish the connection. The priority among the configuration groups 231, 233, and 235 can be determined according to requirements.

The wireless network configuration files of configuration groups 231, 233, and 235 are used to specify parameters used for establishing a wireless connection, such as a service set identifier (SSID) of an access point.

In step S302, a wireless network function of the mobile phone set is activated. The wireless network configuration file set by the telecommunication service supplier is selected from the configuration group 231 (step S303). In step S305, the connection is established based on the wireless network configuration file selected in step S303. If the connection is established successfully, the method proceeds to step S307, otherwise, to step S313.

The method of selecting one wireless network configuration file from the configuration group 231 can be designed according to requirements.

For example, if the wireless network configuration files within the configuration group 231 have been arranged in a particular order, the wireless network configuration files can be selected according to the particular order. For example, the configuration group 231 comprises N wireless network configuration files, and establishing the connection can take T seconds at most for each of the wireless network configuration files. The first wireless network configuration file of configuration group 231 is first selected, an attempt is then made to establish the connection based on the first wireless network configuration file, and so on, until the connection is established successfully, or all of the N wireless network configuration files have been used for the connection. If the connection cannot be established based on any of the N wireless network configuration files, an attempt is made to establish the connection based on the wireless network configuration files of configuration group 233.

Conversely, if the wireless network configuration files within the configuration group 231 have not been arranged in a particular order, the wireless network configuration file can be selected on the basis of the current signal strength of the corresponding access point. The wireless network configuration file corresponding to the access point with strongest signal strength is selected first. If the connection cannot be established with the access point with strongest signal strength is selected first, another wireless network configuration file corresponding to an access point with the second strongest signal strength is selected instead.

For example, the configuration group 231 comprises N wireless network configuration files, and establishing the connection can take T seconds at most for each of the wireless network configuration files. A scanning procedure is first performed to locate access points in the proximity of the mobile phone 20. The SSID of the wireless network configuration files of configuration group 231 are compared with the scan result, and the wireless network configuration files corresponding to the access points found in the scanning procedure are selected preliminarily, and the access point with the strongest signal strength among the preliminarily selected access points are selected as a target for connection. If the connection cannot be established based on the access point with the strongest signal strength, the access point second in the ranking of signal strength is selected instead, and an attempt is made to establish the connection based on the wireless network configuration file corresponding to the selected access point. If the connection cannot be established with any of the access points found in the scanning procedure, an attempt is made to establish the connection based on the wireless network configuration files of configuration group 233. In addition, some access points do not broadcast packets comprising their SSID, and cannot be found by the scanning procedure. The wireless network configuration files not corresponding to any of the access points found in the scanning procedure can be used as a basis for establishing the connection, instead of the wireless network configuration files of the configuration group 233. When the connection cannot be established based on the wireless network configuration files not corresponding to any of the access points found in the scanning procedure, wireless network configuration files of the configuration group 233 are considered next.

The wireless network configuration file set by the subscriber is selected from the configuration group 233 (step S313). In step S315, the connection is established based on the wireless network configuration file selected in step S313. If the connection is established successfully, the method proceeds to step S307, otherwise, to step S333.

The method of selecting one wireless network configuration file from the configuration group 233 can be designed according to requirements.

For example, if the wireless network configuration files within the configuration group 233 have been arranged in a particular order, the wireless network configuration files can be selected according to the particular order. For example, the configuration group 233 comprises N wireless network configuration files, and establishing the connection can take T seconds at most for each of the wireless network configuration files. First, the first wireless network configuration file of configuration group 233 is selected, and an attempt is made to establish the connection based on the first wireless network configuration file, and so on, until the connection is established successfully, or all of the N wireless network configuration files have been used for the connection. If the connection cannot be established based on any of the N wireless network configuration files, an attempt is made to establish the connection based on the wireless network configuration files of configuration group 235.

Conversely, if the wireless network configuration files within the configuration group 233 have not been arranged in a particular order, the wireless network configuration file can be selected on the basis of the current signal strength of the corresponding access point. The wireless network configuration file corresponding to the access point with strongest signal strength is selected first. If the connection cannot be established with the access point with strongest signal strength is selected first, another wireless network configuration file corresponding to an access point with the second strongest signal strength is selected instead.

For example, the configuration group 233 comprises N wireless network configuration files, and establishing the connection can take T seconds at most for each of the wireless network configuration files. A scanning procedure is first performed to locate access points in the proximity of the mobile phone 20. The SSID of the wireless network configuration files of configuration group 233 are compared with the scan result, and the wireless network configuration files corresponding to the access points found in the scanning procedure are selected preliminarily, and the access point with the strongest signal strength among the preliminarily selected access points are selected as a target for connection establishment. If the connection cannot be established based on the access point with the strongest signal strength, the access point second in the ranking of signal strength is selected instead, and an attempt is made to establish the connection based on the wireless network configuration file corresponding to the selected access point. If the connection cannot be established with any of the access points found in the scanning procedure, an attempt is made to establish the connection based on the wireless network configuration files of configuration group 235. In addition, some access points do not send broadcast packets comprising the SSID thereof, and cannot be found by the scanning procedure. The wireless network configuration files not corresponding to any of the access points found in the scanning procedure can be used as a basis for establishing the connection, instead of the wireless network configuration files of the configuration group 235. When the connection cannot be established based on the wireless network configuration files not corresponding to any of the access points found in the scanning procedure, wireless network configuration files of the configuration group 235 are considered next.

The wireless network configuration file is selected from the configuration group 235 (step S333). In step S335, the connection is established according to an automatic search process specified in the wireless network configuration file selected in step S333. For example, the automatic search process directs the mobile phone 20 to search for an unencrypted access point with strong signal strength, and establish wireless connection therewith.

In step S307, the established connection is maintained. In step S308, the connection is terminated in response to an end of a communication session. When the connection disconnects during the communication session (step S309), the method proceeds to procedure A of FIG. 4A.

Figure 4A:
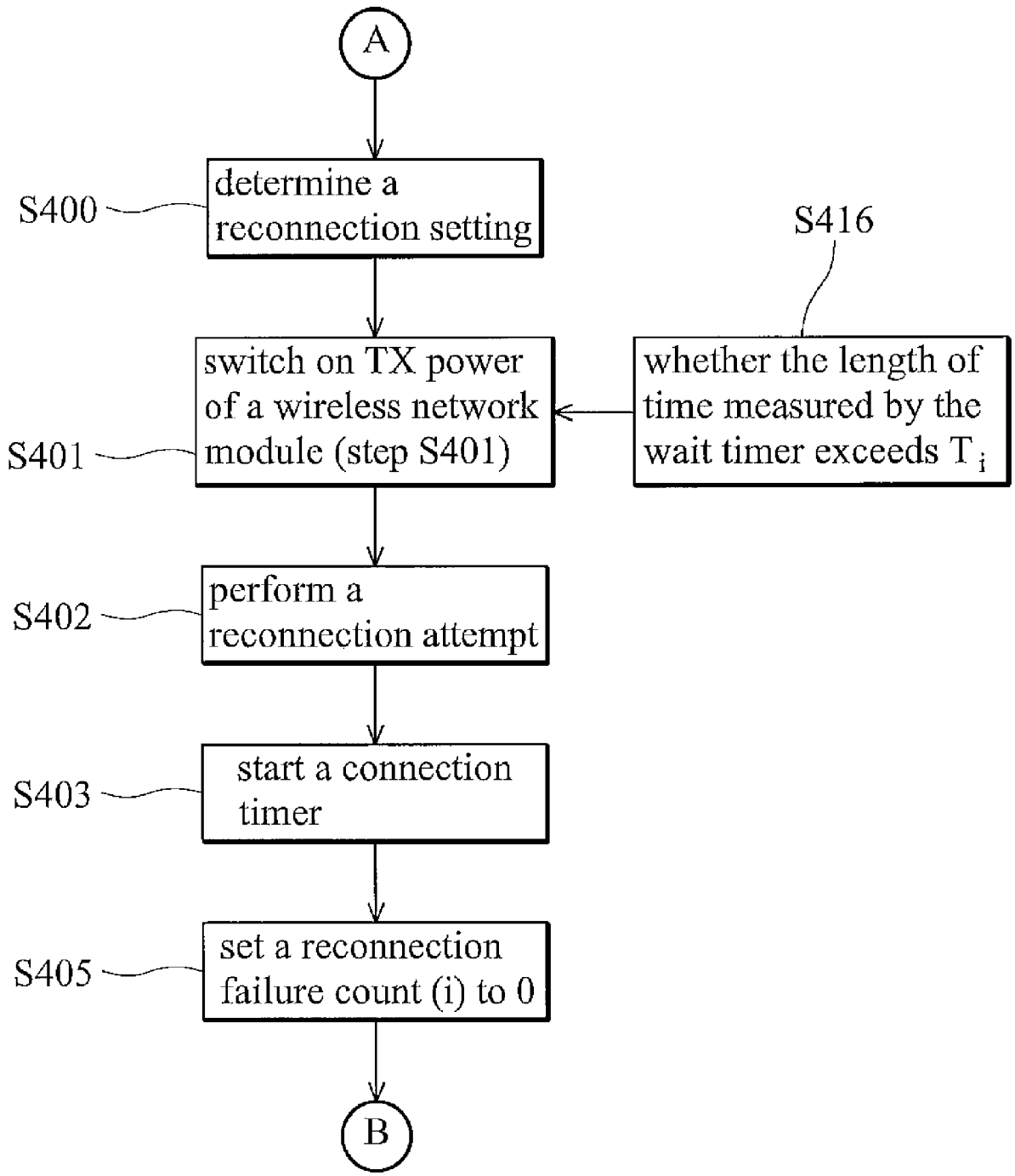
FIGS. 4A and 4B are flowcharts of an embodiment of a method of reestablishing a wireless connection in response to a disconnection.
Figure 4B:
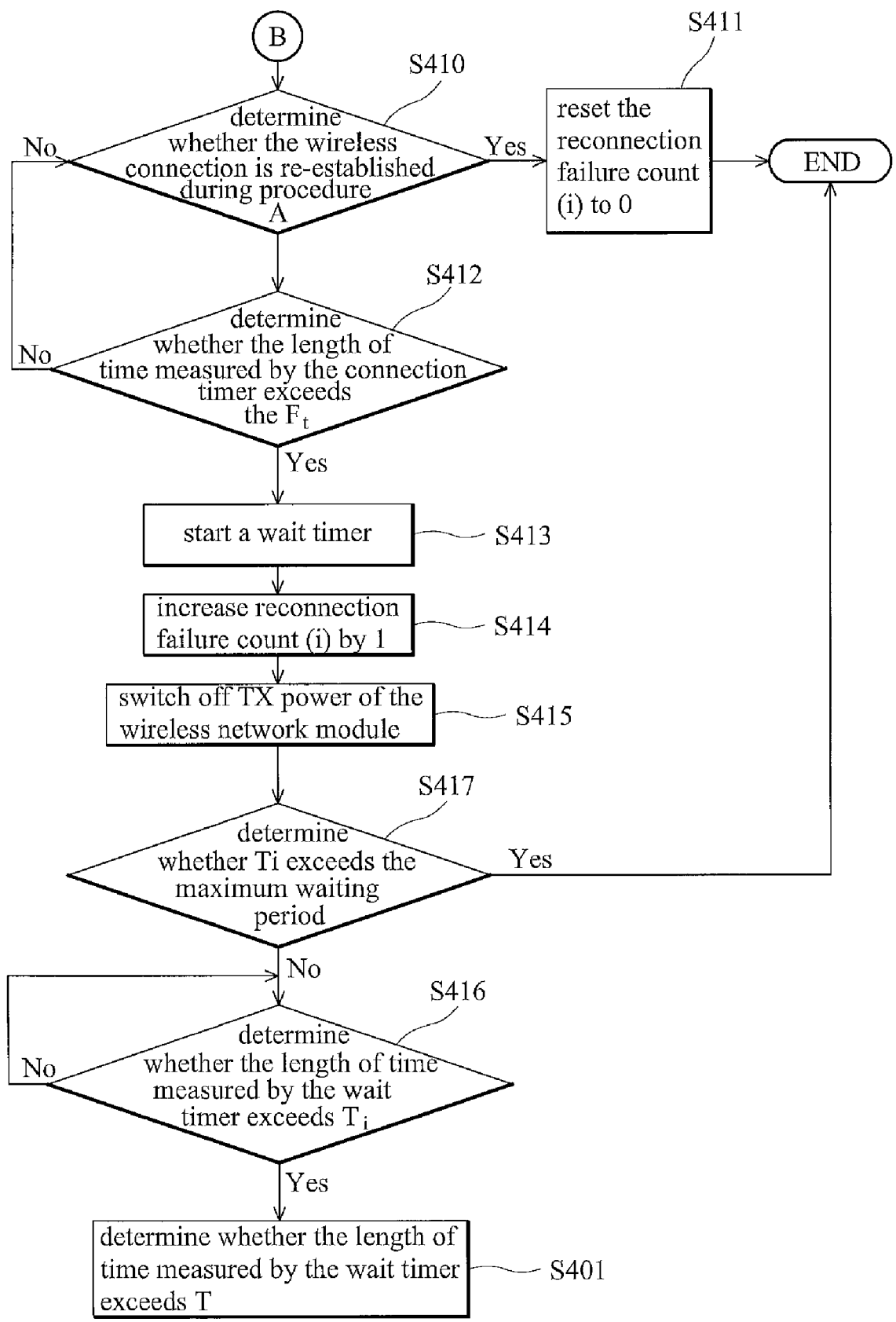

In procedure A of FIG. 4A, an automatic reconnection function is executed. The procedure A is performed to re-establish wireless connection when the wireless connection disconnects after been established. The reconnection function of procedure A is capable of re-establishing the wireless connection without manual operation, thus enabling a continuous communication session. In addition, procedure A is effective in reducing power consumption.

In step S400, a reconnection setting is determined. The reconnection setting comprises parameters used in re-establishing the wireless connection. For example, the reconnection setting comprises a connection time ($F_t$), a series of waiting periods, and a maximum waiting period. If the wireless connection cannot be established during the connection time, this reconnection attempt is considered as a failure. The series of waiting periods are represented as $T_1$, $T_2$, $T_3$, $T_4$, ..., $T_n$. $T_1$ is a waiting period between the first attempt and second reconnection attempt. $T_2$ is a waiting period between the second and third reconnection attempts. Similarly, $T_n$ is a waiting period between the $n^{th}$ reconnection attempt and $(n+1)^{th}$ reconnection attempt. The waiting period of a successive reconnection attempt is longer than the preceding attempt, i.e., $T_1<T_2<T_3<T_4<\ldots<T_n$. The maximum waiting period specifies an upper limit for the series of waiting periods. The series of waiting periods can be determined according to requirements. For example, $T_1$ is 10 seconds, $T_2$ is 20 seconds, $T_3$ is 30 seconds.

When the wireless connection disconnects after being established, the automatic reconnection function is activated, and TX power of a wireless network module is switched on (step S401). A reconnection attempt is performed (step S402), and a connection timer is started (step S403) to measure the time consumed in the corresponding attempt of connection. In addition, a reconnection failure count (i) is set to 0 (step S405). The method proceeds to procedure B.

In step S410 of procedure B, it is determined whether the wireless connection is re-established during procedure A, and if so, the method proceeds to step S411, otherwise, to step S412. In step S411, the reconnection failure count (i) is reset to 0. In step S412, it is determined whether the length of time measured by the connection timer exceeds the connection time ($F_t$) predetermined in step S400, and if so, the method proceeds to step S413, otherwise, to step S410. In step S413, a wait timer is started. The reconnection failure count (i) is increased by 1 (step S414), and TX power of the wireless network module is switched off (step S415). In step S417, a $T_i$ is selected from the series of waiting periods according to the reconnection failure count determined in step S414, and it is determined whether the $T_i$ exceeds the maximum waiting period determined in step S400, and of so, the method ends, otherwise, the method proceeds to step S416. In step S416, it is determined whether the length of time measured by the wait timer exceeds $T_i$, wherein "i" is the reconnection failure count determined in step S414. For example, when the reconnection failure count (i) is 1, $T_i$ is $T_1$, when the reconnection failure count (i) is 2, $T_i$ is $T_2$. If the length of time measured by the wait timer does not exceed $T_i$, it keeps waiting. When the length of time measured by the wait timer exceeds the $T_i$, the method returns to step S401.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless network connection method for a mobile phone, comprising:
   providing a first configuration group, a second configuration group, and a third configuration group, each comprising at least one wireless network configuration file, wherein the wireless network configuration file of the first configuration group is set by a telecommunication service supplier; the wireless network configuration file of the second configuration group is set by a subscriber of the mobile phone; the wireless network configuration file of the third configuration group specifies an automatic search process, directing the mobile phone to automatically search for an access point and establish connection therewith;
   when a wireless network function of the mobile phone is activated, selecting the wireless network configuration file from the first configuration group;
   when failing to establish a wireless connection based on the wireless network configuration file selected from the first configuration group, selecting the wireless network configuration file from the second configuration group;
   when failing to establish a wireless connection based on the wireless network configuration file selected from the second configuration group, selecting the wireless network configuration file from the third configuration group; and
   establishing the wireless connection based on the selected wireless network configuration file.

2. The wireless network connection method of claim 1, wherein the automatic search process directs the mobile phone to search for an unencrypted access point with strong signal strength, and establish wireless connection therewith.

3. The wireless network connection method of claim 1, further setting a time period for establishing the connection for the first, second, and third configuration groups, when the wireless connection based on the wireless network configuration file cannot be established during the time period, regarding failing in establishing the wireless connection based on the selected wireless network configuration file.

4. The wireless network connection method of claim 1, further arranging an order for the at least one wireless network configuration file of the first, second, and third configuration groups, and selecting the wireless network configuration files according to the arranged order, respectively.

5. The wireless network connection method of claim 1, further comprising:
   (a) selecting one of the first, second, and third configuration groups;
   (b) selecting the wireless network configuration file having a particular service identification number from the selected configuration group;
   (c) selecting the wireless network configuration file having the strongest signal strength among the wireless network configuration files corresponding to the particular service identification number;
   (d) establishing the wireless connection according to the wireless network configuration file selected in step (c); and
   (e) when failing to establish wireless connection in step (d), selecting the wireless network configuration file having the second strongest signal strength among the wireless network configuration files corresponding to the particular service identification number, and returning to step (d).

6. The wireless network connection method of claim 5, when the wireless network configuration file selected in step (b) has been utilized in step (d), returning to step (a) to select another configuration group.

7. The wireless network connection method of claim 5, when the wireless network configuration file selected in step (b) has been utilized in step (d), selecting the wireless network configuration file having a service identification number other than the one used in step (b) from the configuration group selected in step (a), and performing the step (b).

8. The wireless network connection method of claim 1, when failing to establish wireless connection based on the wireless network configuration file of the third configuration group, further selecting the wireless network configuration file from the first configuration group.

9. The wireless network connection method of claim 1, when the wireless connection disconnects after been established, the method further comprising:
   determining a first waiting period and a second waiting period, wherein the second waiting period is longer than the first waiting period;
   when the time interval since the disconnection of the wireless connection exceeds the first waiting period, reconnecting the wireless connection over the access point based on the disconnected wireless connection;

when the attempt to reconnect fails for the first time, waiting for the second waiting period, and attempt to re-establish connection making a second attempt to reconnect over the access point corresponding to the disconnected wireless connection.

10. The wireless network connection method of claim 9, further switching off a wireless module of the mobile phone during the first waiting period and the second waiting period.

11. The wireless network connection method of claim 9, further determining a maximum waiting period, quitting the reconnection when the second waiting period equals to or exceeds the maximum waiting period.

12. A mobile phone, comprising:
a wireless connection module, establishing a wireless connection between the mobile phone and an access point;
a storage device, storing a first configuration group, a second configuration group, and a third configuration group, each comprising at least one wireless network configuration file, wherein the wireless network configuration file of the first configuration group is set by a telecommunication service supplier; the wireless network configuration file of the second configuration group is set by a subscriber of the mobile phone; the wireless network configuration file of the third configuration group specifies an automatic search process, directing the mobile phone to automatically search for an access point and establish connection therewith;
a controller, when a wireless network function of the mobile phone is activated, selecting the wireless network configuration file from the first configuration group, when failing to establish a wireless connection based on the wireless network configuration file selected from the first configuration group, selecting the wireless network configuration file from the second configuration group, when failing to establish a wireless connection based on the wireless network configuration file selected from the second configuration group, selecting the wireless network configuration file from the third configuration group, and establishing the wireless connection according to the selected wireless network configuration file.

13. The mobile phone of claim 12, wherein the automatic search process directs the mobile phone to search for an unencrypted access point with strong signal strength, and establish wireless connection therewith.

14. The mobile phone of claim 12, wherein the controller further sets a time period for establishing the connection for the first, second, and third configuration groups, when the wireless connection based on the wireless network configuration file cannot be established during the time period, regards failing to establish wireless connection based on the selected wireless network configuration file.

15. The mobile phone of claim 12, wherein the controller further arranges an order for the at least one wireless network configuration file of the first, second, and third configuration groups, and selects the wireless network configuration files according to the arranged order, respectively.

16. The mobile phone of claim 12, wherein the controller further performs the steps of:
(a) selecting one of the first, second, and third configuration groups;
(b) selecting the wireless network configuration file having a particular service identification number from the selected configuration group;
(c) selecting the wireless network configuration file having the strongest signal strength among the wireless network configuration files corresponding to the particular service identification number;
(d) establishing the wireless connection according to the wireless network configuration file selected in step (c); and
(e) when failing to establish wireless connection in step (d), selecting the wireless network configuration file having the second strongest signal strength among the wireless network configuration files corresponding to the particular service identification number, and returning to step (d).

17. The mobile phone of claim 16, wherein the controller, when the wireless network configuration file selected in step (b) has been utilized in step (d), returns to step (a) to select another configuration group.

18. The mobile phone of claim 12, wherein the controller, when the wireless network configuration file selected in step (b) has been utilized in step (d), selects the wireless network configuration file having a service identification number other than the one used in step (b) from the configuration group selected in step (a), and performs the step (b).

19. The mobile phone of claim 12, wherein the controller, when failing to establish wireless connection based on the wireless network configuration file of the third configuration group, further selects the wireless network configuration file from the first configuration group.

20. The mobile phone of claim 12, wherein the controller, when the wireless connection disconnects after being established, further performs the steps of:
determining a first waiting period and a second waiting period, wherein the second waiting period is longer than the first waiting period;
when the time interval since the disconnection of the wireless connection exceeds the first waiting period, re-establishing the wireless connection over the access point based on the disconnected wireless connection;
when the attempt to re-establish connection fails for the first time, waiting for the second waiting period, and attempt to re-establish connection making a second attempt to reconnect over the access point corresponding to the disconnected wireless connection.

21. The mobile phone of claim 12, wherein the controller further determines a maximum waiting period, quits the reconnection when the second waiting period is equal to or exceeds the maximum waiting period.

* * * * *